United States Patent
Everly

(10) Patent No.: US 12,000,439 B2
(45) Date of Patent: Jun. 4, 2024

(54) TRANSFER CASE YOKE

(71) Applicant: Jeff Everly, Chandler, IN (US)

(72) Inventor: Jeff Everly, Chandler, IN (US)

(73) Assignee: Drivelines Plus Inc., Chandler, IN (US)

( * ) Notice: Subject to any disclaimer, the term of this patent is extended or adjusted under 35 U.S.C. 154(b) by 77 days.

(21) Appl. No.: 17/500,547

(22) Filed: Oct. 13, 2021

(65) Prior Publication Data

US 2022/0112922 A1    Apr. 14, 2022

Related U.S. Application Data

(60) Provisional application No. 63/091,029, filed on Oct. 13, 2020.

(51) Int. Cl.
| | | |
|---|---|---|
| *F16D 3/38* | (2006.01) | |
| *F16B 21/18* | (2006.01) | |
| *F16D 1/076* | (2006.01) | |
| *F16D 1/10* | (2006.01) | |
| *F16D 1/116* | (2006.01) | |

(52) U.S. Cl.
CPC ............ *F16D 3/387* (2013.01); *F16B 21/183* (2013.01); *F16D 1/076* (2013.01); *F16D 1/116* (2013.01); *F16D 2001/103* (2013.01); *Y10T 403/7033* (2015.01)

(58) Field of Classification Search
CPC ...... F16B 21/18; F16B 21/183; F16B 21/186; F16D 1/033; F16D 1/076; F16D 1/116; F16D 3/387; F16D 2001/103; Y10T 403/7033
USPC ......................................... 464/134, 135, 182
See application file for complete search history.

(56) References Cited

U.S. PATENT DOCUMENTS

| | | | | |
|---|---|---|---|---|
| 6,561,720 | B2 * | 5/2003 | Wirth .................... | F16B 21/183 403/368 |
| 6,582,151 | B2 * | 6/2003 | Hopson ................... | F16D 1/112 464/182 |
| 7,029,398 | B1 * | 4/2006 | Burnard .................. | F16D 3/387 464/134 |

(Continued)

FOREIGN PATENT DOCUMENTS

| | | | | |
|---|---|---|---|---|
| DE | 1945627 A1 | * | 3/1970 | ............ F16B 21/183 |
| DE | 2950637 A1 | * | 6/1981 | ............ F16B 21/183 |
| DE | 10008183 C1 | * | 12/2001 | .............. F16D 1/116 |

*Primary Examiner* — Josh Skroupa
(74) *Attorney, Agent, or Firm* — David E. Novak; Brannon Sowers & Cracraft PC

(57) ABSTRACT

A yoke for a transfer case output shaft includes a hollow cylindrical sleeve portion and a disc-shaped flange portion extending radially from an outer portion of the hollow cylindrical sleeve portion. The hollow cylindrical sleeve portion includes a plurality of inwardly extending splines configured to engage outwardly extending splines of the transfer case outlet shaft. The disc-shaped flange portion has a plurality of fastener openings therethrough that correspond to fastener openings through a flange portion of a companion flange. A notch is formed through the hollow cylindrical sleeve portion at an open end of the hollow cylindrical sleeve portion. A groove is formed within the inner surface of the hollow cylindrical sleeve and extends about a rotation axis of the hollow cylindrical sleeve portion. A C-clip is received within the groove for restricting axial movement along the rotation axis and includes open ends that are received within the notch.

11 Claims, 3 Drawing Sheets

(56) References Cited

U.S. PATENT DOCUMENTS

| | | | |
|---|---|---|---|
| 7,213,999 B2 * | 5/2007 | Haas | F16B 5/0275 |
| | | | 464/182 |
| 7,314,416 B2 * | 1/2008 | Loughrin | F16D 3/387 |
| | | | 464/182 |
| 7,722,089 B2 * | 5/2010 | Nauer | F16L 37/0885 |
| | | | 285/308 |
| 11,598,376 B2 * | 3/2023 | Hopson | F16D 1/116 |
| 2009/0102152 A1 * | 4/2009 | Wallace | B60G 7/008 |
| | | | 280/124.1 |
| 2018/0320742 A1 * | 11/2018 | Hopson | F16D 1/116 |

* cited by examiner

TRANSFER CASE YOKE

BACKGROUND

This specification relates to drivetrains. More specifically, the present technology is in the technical field of transfer case output yokes for a four-wheel drive vehicle.

The drivetrain of a motor vehicle consists of various components that deliver power to the driving wheels, and, more particularly, the function of the drivetrain is to couple the engine that produces the power to the driving wheels that use the mechanical power to rotate one or both of the axles. Connecting these components, which may be spaced apart relative to other components, including the driving wheels, requires the use of driveshafts to transfer the power. These various components making up the complex drivetrain vary greatly across types of vehicles, along with makes and models of vehicles. As such, aftermarket parts, or replacement parts, not made by the original equipment manufacturer, must be tailored specifically for use with a particular make and model of vehicle.

A lift kit is a set of aftermarket parts used to lift the body of a vehicle and provide greater ground clearance. The lift kit may include only a few components, such as, for example, lift blocks, shocks, driveshafts, etc., or, for more extensive lifts, the lift kit may require suspension, steering, and drivetrain parts. Since the lift kit is comprised of various aftermarket parts, the manufacturer of these lift kits, along with the manufacturer of various other replacement parts, will have to produce a number of different aftermarket parts that are compatible with the make and model of vehicle for which they are designed.

For lift kits and various other vehicle components or parts, the manufacturer of these replacement parts must continually update parts to match those of the original equipment manufacturer, which are frequently changing. That is, when any original equipment manufacturer parts change, the corresponding aftermarket parts need to change accordingly.

The present technology addresses deficiencies in the current state of drivetrain technology.

SUMMARY

This specification relates to the field of vehicle drivetrains. More specifically, the present technology is in the technical field of aftermarket components for vehicle drivetrains.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like element.

DETAILED DESCRIPTION

Before the present methods, implementations, and systems are disclosed and described, it is to be understood that this invention is not limited to specific methods, specific components, implementation, or to particular compositions, and as such may, of course, vary. It is also to be understood that the terminology used herein is for the purpose of describing particular implementations only and is not intended to be limiting.

As used in the specification and the claims, the singular forms "a," "an" and "the" include plural referents unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

Figure 1:
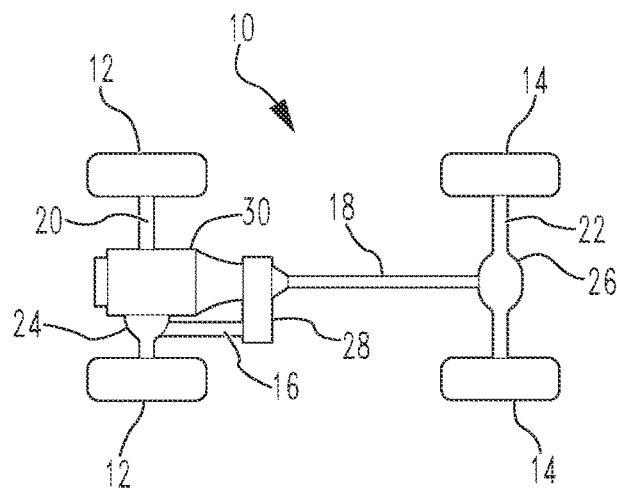
FIG. 1 depicts a high level diagram of an exemplary drivetrain, according to the present disclosure.

FIG. 1 depicts a high-level exemplary drivetrain schematic 10 according to the present disclosure. The function of the drivetrain 10 is to couple the engine (not shown) that produces power to rotate front driving wheels 12 and rear driving wheels 14 via front and rear driveshafts 16 and 18 and front and rear axle assemblies 20 and 22.

The exemplary drivetrain 10 also includes two differentials 24 and 26 and a transfer case 28. One differential 24 is located between the front two wheels 12 and the other differential 26 is located between the rear two wheels 14. The differentials send torque from the engine and a transmission 30 to the drive wheels 12 and 14 via the transfer case 28, driveshafts 24 and 28 and differentials 24 and 26. The transfer case 28 splits the power between the front and rear axle assemblies 20 and 22 of four-wheel-drive vehicles.

Figure 2:
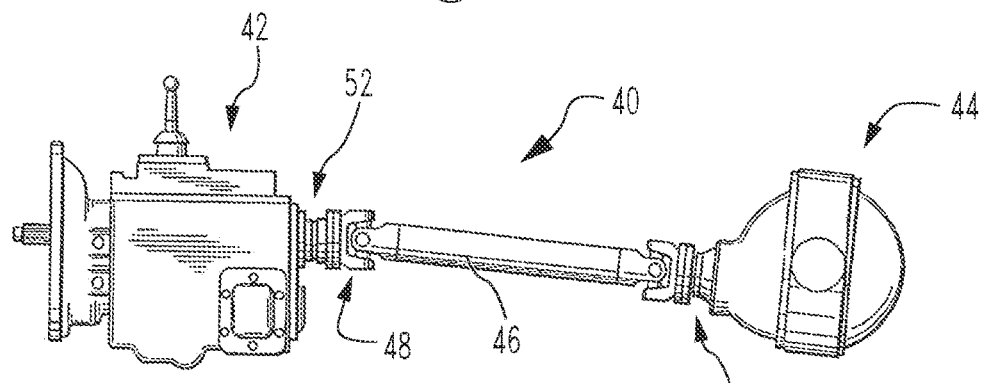
FIG. 2 depicts a portion of an exemplary drivetrain, including a transfer case outlet, yoke and driveshaft, according to the present disclosure.

FIG. 2 shows a portion of a driveshaft assembly 40, whose components may operate similarly to those described in FIG. 1, between a transfer case 42 and an axle assembly 44. A driveshaft 46 is coupled to the transfer case 42 via an output assembly 48 and is coupled to the axle assembly 44 via an input assembly 50.

The transfer case 42 transfers power from a transmission to front and rear axles, including axle assembly 44, using drive shafts, such as driveshaft 46. The transfer case 42 has an output shaft 52 that is connected to an input shaft (not shown) of the axle assembly 44 through the driveshaft assembly 40. The transfer case 42 is rotatably driven by the transmission, which is driven by an engine. The driveshaft assembly 40 includes a cylindrical driveshaft tube 46 having a center portion and a pair of opposed end portions.

Figure 3:
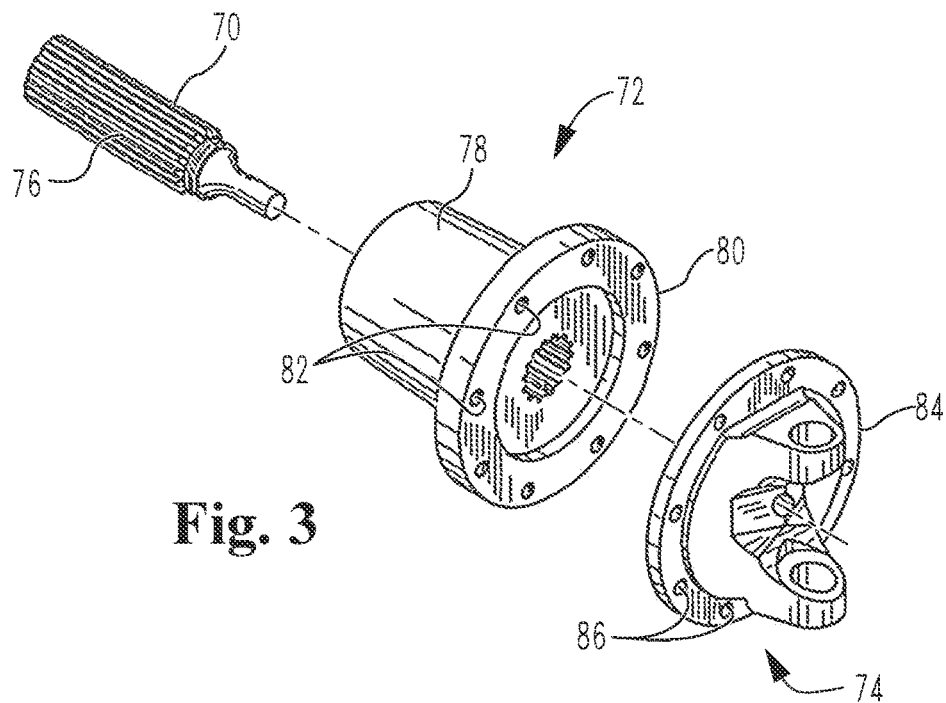
FIG. 3 depicts an exploded view of a transfer case output shaft, the yoke, and companion flange, according to the present disclosure.

FIG. 3 depicts an exploded view of a transfer case output shaft 70, a yoke 72, and a companion flange 74. The companion flange 74 mates with the yoke 72, also referred to as a flange yoke that, in turn, is supported on a male splined shaft 76, which is an output shaft of the transfer case. As used herein, splines are ridges or teeth on a driveshaft that mesh with splines in a mating piece and transfer torque to it. The yoke 72 includes a female splined sleeve portion 78 that cooperates with the male splined shaft 76 and a disc-shaped flange portion 80 that extends radially from an outer portion of the hollow cylindrical sleeve portion 78. The disc-shaped flange portion 80 has a plurality of fastener openings 82 formed therethrough.

The companion flange 74 includes a flange portion 84 that has a plurality of apertures 86 formed therethrough that correspond generally in size and location with the plurality of apertures 82 formed through the flange portion 80 of the yoke 72. When the flange portion 80 of the yoke 72 is disposed adjacent the flange portion 84 of the companion flange 74, fasteners may be positioned through the apertures 82 and 86 to secure positioning of the components. The companion flange 74 allows connection of a flange yoke 72 to another type of connection, for torque transfer.

Figure 4:
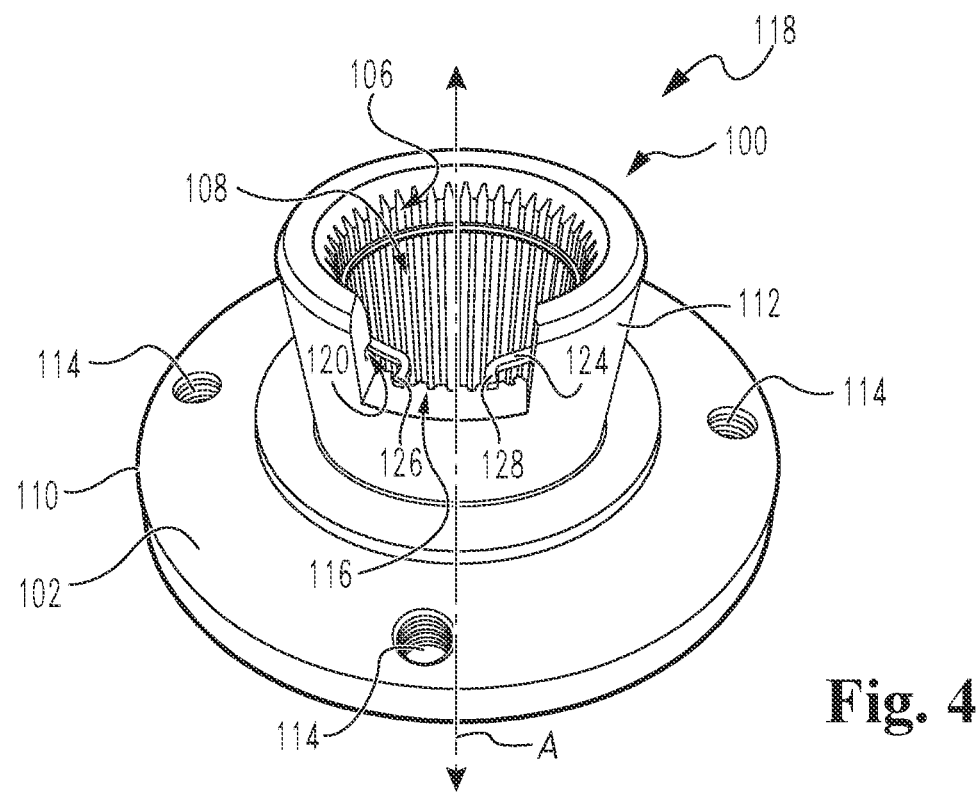
FIG. 4 depicts a perspective view of an exemplary yoke, according to the present disclosure.
Figure 5:
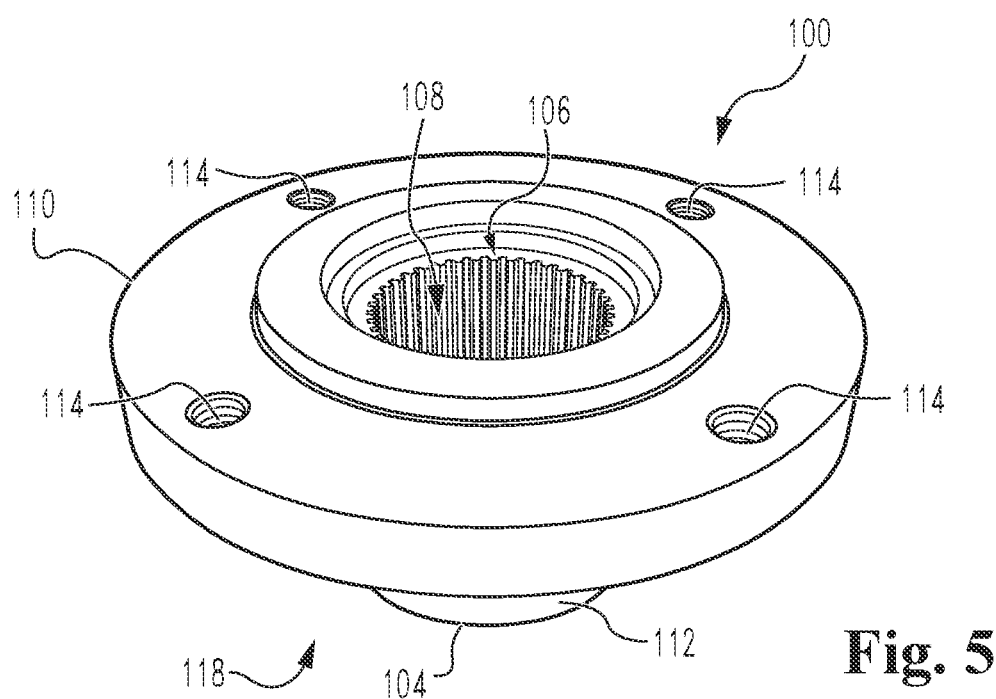
FIG. 5 depicts another perspective view of the exemplary yoke of FIG. 4, according to the present disclosure.

FIGS. 4 and 5 show different perspective views of an exemplary yoke 100, according to the present disclosure. The yoke 100 includes a hollow cylindrical sleeve portion 104 including a plurality of inwardly extending splines 106 formed on an inner surface 108 of the hollow cylindrical sleeve portion 104. The inwardly extending splines 106 are configured to engage outwardly extending splines of the transfer case output shaft (shown in previous FIGS). According to the exemplary embodiment, the hollow cylindrical sleeve portion 104 includes forty-two (42) inwardly extending splines 106 for engaging with a corresponding number of outwardly extending splines of the transfer case output shaft.

The exemplary yoke 100 also includes a disc-shaped flange portion 110 that extends radially from an outer portion 112 of the hollow cylindrical sleeve portion 104. The disc-shaped flange portion 110 has a plurality of fastener openings 114 therethrough. The number, size and location of the apertures 114 may match the number, size and location of apertures of the flange portion of the companion flange. According to a specific embodiment, the disc-shaped flange portion 110 includes four (4) fastener openings 114 spaced around a circumference region of a face of the disc-shaped flange portion 110. Thus, when these components are assembled, the transfer case output shaft, yoke 100 and companion flange rotate together.

As shown, the yoke 100 includes a notch 116 formed through the hollow cylindrical sleeve portion 104 at one end 118 thereof. A groove 120 is formed within the inner surface 108 of the hollow cylindrical sleeve portion 104 and extends about an axis of rotation A. A C-clip 124 is received within the groove 120 for restricting axial movement relative to the rotation axis A. The two (2) free ends 126 and 128 of the C-clip 124 are received within the notch 116.

Figure 6:
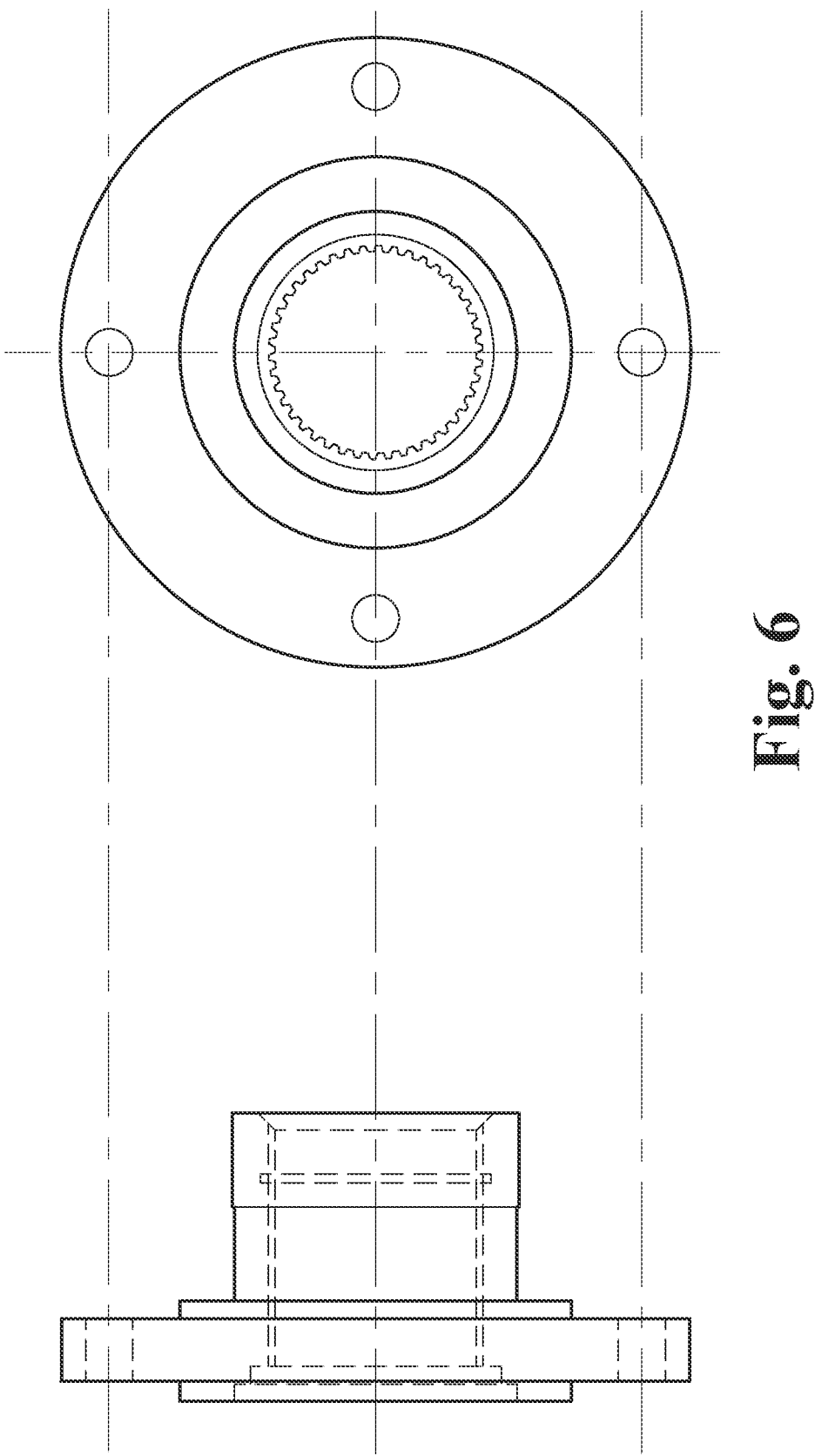
FIG. 6 is an engineering print of the yoke of FIGS. 4 and 5, according to the present disclosure.

FIG. 6 is an engineering print of the yoke, according to the present disclosure. The engineering drawing is a technical drawing used to convey information about an object. A common use is to specify the geometry necessary for the construction of a component and is called a detail drawing.

The transfer case yoke of the present disclosure meshes with a transfer case output shaft, as described above, and, therefore, rotates with the transfer case output shaft. The C-clip is positioned in a groove of the yoke to limit axial movement of the respective components. The disc-shaped flange portion of the yoke may be aligned with and fastened to the flange portion of a companion flange, thus enabling the companion flange to rotate with the yoke and the transfer case output shaft to transfer torque. The window, or access opening, of the yoke receives the free ends of the C-clip therethrough.

Although the yoke described herein may have broad applicability, it is presented in the context of a replacement part for 2019 Dodge Rams 2500, 3500, 4500 and 5500.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A yoke for a transfer case output shaft in combination with a lift kit for a vehicle, including:
   a hollow cylindrical sleeve portion;
   wherein the hollow cylindrical sleeve portion includes a plurality of inwardly extending splines formed on an inner surface on the hollow cylindrical sleeve portion;
   wherein the inwardly extending splines are configured to engage with outwardly extending splines of the transfer case output shaft;
   a disc-shaped flange portion extending radially from an outer portion of the hollow cylindrical sleeve portion;
   wherein the disc-shaped flange portion has a plurality of fastener openings therethrough;
   wherein an outer surface of the yoke is stepped along its longitudinal axis with an outer diameter being greatest at the disc-shaped flange portion;
   wherein the fastener openings of the disc-shaped flange portion correspond in size and location with a plurality of fastener openings through a flange portion of a companion flange;
   wherein, in an assembled configuration, the transfer case output shaft, yoke and companion flange rotate together;
   a notch through the hollow cylindrical sleeve portion at an end of the hollow cylindrical sleeve portion;
   a groove formed within the inner surface of the hollow cylindrical sleeve portion and extending about a rotation axis of the hollow cylindrical sleeve; and
   a C-clip received within the groove for restricting axial movement relative to the rotation axis;
   wherein open ends of the C-clip are received within the notch;
   wherein the yoke is installed in combination with a lift kit for a vehicle having a first driveshaft angle articulation;
   wherein the lift kit provides a second driveshaft angle articulation greater than the first driveshaft angle articulation after components of the lift kit and the yoke are installed on the vehicle.

2. The yoke of claim 1, wherein the hollow cylindrical sleeve includes forty two (42) inwardly extending splines formed on the inner surface of the hollow cylindrical sleeve.

3. The yoke of claim 1, wherein the disc-shaped flange portion includes four fastener openings therethrough that are spaced about a circumference region of a face of the disc-shaped flange portion.

4. The yoke of claim 3, wherein the inner surfaces of the fastener openings through the disc shaped flange portion are threaded.

5. The yoke of claim 1, wherein the yoke includes at least one counterbore within a central opening through the disc-shaped flange portion.

6. The method of claim 1, wherein an inner surface of the yoke at an end opposite the disc-shaped flange portion is tapered.

7. A method for installing a lift kit and a yoke on a vehicle, including steps of:
- removing components of a conventional drivetrain corresponding to components of lift kit;
- installing the components of the lift kit on the vehicle;
- installing the yoke for a transfer case output shaft on the vehicle;
- wherein the yoke includes:
  - a hollow cylindrical sleeve portion, wherein the hollow cylindrical sleeve portion includes a plurality of inwardly extending splines formed on an inner surface on the hollow cylindrical sleeve portion;
  - wherein the inwardly extending splines are configured to engage with outwardly extending splines of the transfer case output shaft;
  - a disc-shaped flange portion has a plurality of fastener openings therethrough;
  - wherein an outer surface of the yoke is stepped along its longitudinal axis with an outer diameter being greatest at the disc-shaped flange portion;
  - wherein the fastener openings of the disc-shaped flange portion correspond in size and location with a plurality of fastener openings through a flange portion of a companion flange;
  - wherein, in an assembled configuration, the transfer case output shaft, yoke and companion flange rotate together;
  - a notch through the hollow cylindrical sleeve portion at an end of the hollow cylindrical sleeve portion;
  - a groove formed within the inner surface of the hollow cylindrical sleeve portion and
- extending about a rotation axis of the hollow cylindrical sleeve; and
  - a C-clip received within the groove for restricting axial movement relative to the rotation axis;
  - wherein open ends of the C-clip are received within the notch.

8. The method of claim 7, wherein the yoke is a component of a universal joint of the vehicle.

9. The method of claim 7, wherein the hollow cylindrical sleeve includes forty-two inwardly extending spines formed on the inner surface of the how cylindrical sleeve.

10. The method of claim 7, wherein the disc-shaped flanged portion includes four fastener openings therethrough that are spaced about a circumference region of a face of the disc-shaped flange portion.

11. The method of claim 7, wherein inner surfaces of the fastener openings through the disc shaped flange portion are threaded.

* * * * *